United States Patent [19]
Saulnier et al.

[11] Patent Number: 6,133,552
[45] Date of Patent: Oct. 17, 2000

[54] SENSOR ASSEMBLY FOR GLASS-CERAMIC COOKTOP APPLIANCE AND METHOD OF CALIBRATING

[75] Inventors: Emilie Thorbjorg Saulnier, Rexford; Ertugrul Berkcan, Niskayuna, both of N.Y.

[73] Assignee: General Electric Company, Schenectady, N.Y.

[21] Appl. No.: 09/372,468

[22] Filed: Aug. 11, 1999

[51] Int. Cl.[7] ................................. H05B 3/68; G01J 5/00
[52] U.S. Cl. ........................... 219/446.1; 250/338.1; 374/132
[58] Field of Search ................ 219/445.1, 446.1, 219/448.11, 460.1, 461.1; 250/338.1, 339.03, 339.04, 339.06, 339.11, 341.8; 374/121, 124, 126, 127, 131, 132

[56] References Cited

U.S. PATENT DOCUMENTS

| | | |
|---|---|---|
| 3,137,170 | 6/1964 | Astheimer ........................ 250/339.04 |
| 4,237,368 | 12/1980 | Welch . |
| 4,730,940 | 3/1988 | Herber et al. ......................... 374/127 |
| 4,740,664 | 4/1988 | Payne et al. . |
| 5,180,226 | 1/1993 | Moslehi ................................ 374/127 |
| 5,227,610 | 7/1993 | Schultheis et al. . |
| 5,231,595 | 7/1993 | Makino et al. .................... 250/339.03 |
| 5,249,142 | 9/1993 | Shirakawa et al. ............... 250/339.04 |
| 5,319,202 | 6/1994 | Pompei . |
| 5,389,764 | 2/1995 | Nishii et al. . |
| 5,488,214 | 1/1996 | Fettig et al. . |
| 5,528,041 | 6/1996 | Pompei . |
| 5,709,473 | 1/1998 | Sultan et al. ............................ 374/131 |

*Primary Examiner*—Sang Paik

[57] ABSTRACT

A sensor assembly for a glass-ceramic cooktop appliance having at least one burner assembly disposed under a glass-ceramic plate. The sensor assembly includes a waveguide having a first end disposed in the burner assembly and a second end disposed outside of the burner assembly, and at least one detector located adjacent to the waveguide's second end. A radiation collector is located adjacent to the first end of the waveguide so as to direct incident radiation into the waveguide. The radiation collector includes a plurality of reflective surfaces and a mechanism for adjusting the position of the reflective surfaces relative to one another in order to adjust the sensor assembly's field of view.

16 Claims, 5 Drawing Sheets

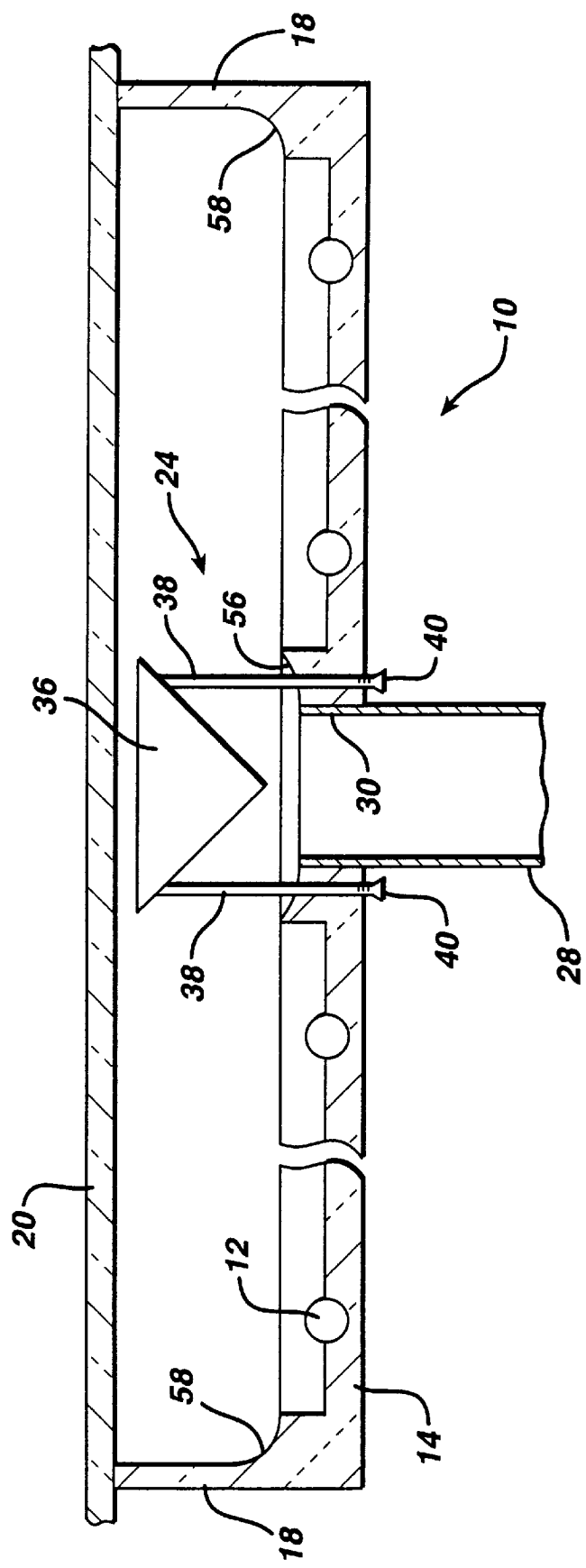

SENSOR ASSEMBLY FOR GLASS-CERAMIC COOKTOP APPLIANCE AND METHOD OF CALIBRATING

BACKGROUND OF THE INVENTION

This invention relates generally to glass-ceramic cooktop appliances and more particularly to methods and devices for sensing properties relating to the appliance, such as temperature of the glass-ceramic cooktop surface, properties of cooking utensils placed on the cooktop, and properties of the utensil contents.

The use of glass-ceramic plates as cooktops in cooking appliances is well known. Such glass-ceramic cooktops have a smooth surface that presents a pleasing appearance and is easily cleaned in that the smooth, continuous surface prevents spillovers from falling onto the energy source underneath the cooktop.

In one known type of glass-ceramic cooktop appliance, the glass-ceramic plate is heated by radiation from an energy source, such as an electric coil or a gas burner, disposed beneath the plate. The glass-ceramic plate is sufficiently heated by the energy source to heat utensils upon it primarily by conduction from the heated glass-ceramic plate to the utensil. Another type of glass-ceramic cooktop appliance uses an energy source that radiates substantially in the infrared region in combination with a glass-ceramic plate that is substantially transparent to such radiation. In these appliances, a utensil placed on the cooktop is heated partially by radiation transmitted directly from the energy source to the utensil, rather than by conduction from the glass-ceramic plate. Such radiant glass-ceramic cooktops are more thermally efficient than other glass-ceramic cooktops and have the further advantage of responding more quickly to changes in the power level applied to the energy source. Yet another type of glass-ceramic cooktop appliance inductively heats utensils placed on the cooktop. In this case, the energy source is an RF generator that emits RF energy when activated. The utensil, which contains an appropriate material, absorbs the RF energy and is thus heated.

In each type of glass-ceramic cooktop appliances, provision must be made to avoid overheating the cooktop. For most glass-ceramic materials, the operating temperature should not exceed 600–700° C. for any prolonged period. Under normal operating conditions, the temperature of the glass-ceramic plate will generally remain below this limit. However, conditions can occur which can cause this temperature limit to be exceeded. Commonly occurring examples include operating the appliance with no load, i.e., no utensil, on the cooktop surface, using badly warped utensils that make uneven contact with the cooktop surface, and operating the appliance with a shiny and/or empty utensil.

To protect the glass-ceramic from extreme temperatures, glass-ceramic cooktop appliances ordinarily have some sort of temperature sensing device that removes power from the energy source if high temperatures are detected. In addition to providing thermal protection, such temperature sensors can be used to provide temperature-based control of the cooking surface and to provide a hot surface indication, such as a warning light, after a burner has been turned off.

One common approach to sensing temperature in glass-ceramic cooktop appliances is to place a temperature sensor directly on the underside of the glass-ceramic plate. With this approach, however, the temperature sensor is subject to the high burner temperatures and thus more susceptible to failure. Moreover, the sensor detects some average flux and does not produce a direct measurement of the glass-ceramic temperature. Thus, it is desirable to use an optical sensor assembly that "looks" at the glass-ceramic surface from a remote location to detect the temperature of the surface. Remote sensor assemblies are also capable of "looking" through the glass-ceramic plate to detect characteristics of a utensil placed on the cooktop, such as the temperature, size or type of the utensil, the presence or absence of the utensil, or the properties, such as boiling state, of the utensil contents.

Variations in the field of view of remote sensor assemblies can affect their performance in detecting the properties of a cooktop and/or utensil. Such variations can occur due to differences between individual burner assemblies, manufacturing variations, and the reuse of common parts across various burner models and products. If the field of view of individual sensor assemblies is not properly adjusted, then the accuracy of the sensor's measurements will suffer.

Accordingly, there is a need for a remote sensor assembly that can be calibrated to adjust the field of view and a method for calibrating such an assembly.

SUMMARY OF THE INVENTION

The above-mentioned needs are met by the present invention which provides a sensor assembly for a glass-ceramic cooktop appliance having at least one burner assembly disposed under a glass-ceramic plate. The sensor assembly includes a waveguide having a first end disposed in the burner assembly and a second end disposed outside of the burner assembly, and at least one detector located adjacent to the waveguide's second end. A radiation collector is located adjacent to the first end of the waveguide so as to direct incident radiation into the waveguide. The radiation collector includes a plurality of reflective surfaces and a mechanism for adjusting the position of the reflective surfaces relative to one another in order to adjust the sensor assembly's field of view.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 12 is a sectional view of a burner assembly having a fifth embodiment of the sensor assembly of the present invention.

DETAILED DESCRIPTION OF THE INVENTION

Figure 1:
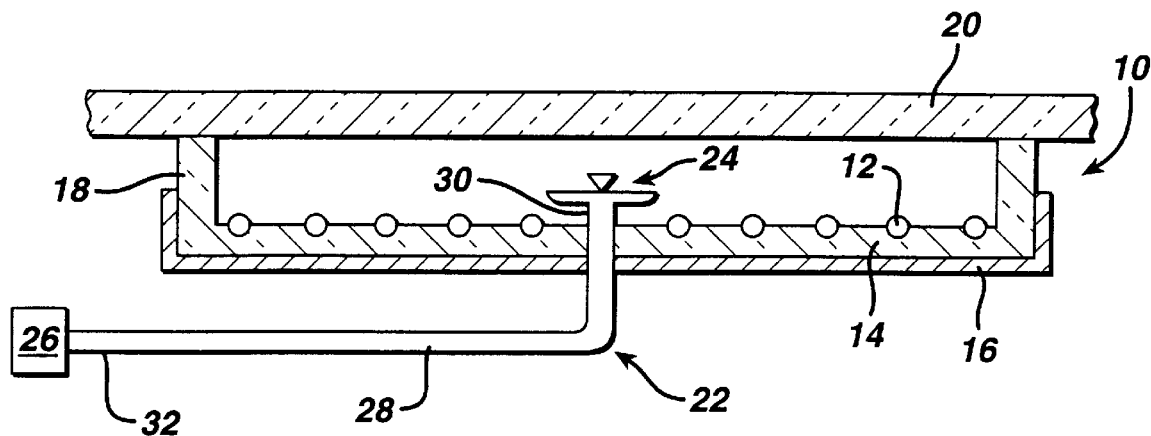
FIG. 1 is a sectional view of a burner assembly having a first embodiment of the sensor assembly of the present invention.

Referring to the drawings wherein identical reference numerals denote the same elements throughout the various views, FIG. 1 shows a burner assembly 10 of the type suitable for use in a glass-ceramic cooktop appliance, which typically includes a plurality of such burner assemblies. As used herein, the term "cooktop" is intended to refer to both the flat top of a range or stove and a built-in cabinet-top cooking apparatus. Burner assembly 10 includes an open coil electrical resistance element 12, which is designed when fully energized to radiate primarily in the infrared region of the electromagnetic energy spectrum. It should be noted that another type of energy source, such as a gas burner, could be used in place of element 12. Element 12 is arranged in an effective heating pattern such as a concentric coil and is secured to the base of an insulating liner 14 which is supported in a sheet metal support pan 16. Insulating liner 14 includes an annular, upwardly extending portion 18 which serves as an insulating spacer between element 12 and a glass-ceramic plate 20 that provides the cooktop surface. Support pan 16 is spring loaded upwardly, forcing annular portion 18 into abutting engagement with the underside of glass-ceramic plate 20, by conventional support means (not shown).

An optical sensor assembly 22 is provided to detect one or more characteristics relating to the cooking appliance, such as the temperature of glass-ceramic plate 20, the presence or absence of a utensil on the cooktop, the temperature, size or type of utensil on the cooktop, or the properties or state of the utensil contents. Sensor assembly 22 includes a radiation collector 24 disposed in the interior of burner assembly 10 underneath glass-ceramic plate 20. This location provides radiation collector 24 with a field of view of the desired sensing location (i.e., the portion of glass-ceramic plate 20 directly over burner assembly 10). Radiation gathered by radiation collector 24 is delivered to at least one optical detector 26 (additional detectors may be employed) located at a relatively cool place outside of burner assembly 10 via a light pipe or waveguide 28. Detector 26 can be any suitable type of detector such as bolometer or thermopile. Waveguide 28 allows detector 26 to be located where the thermal environment is more favorable. The use of waveguides also permits the co-location and sharing of detectors among several burner assemblies.

Waveguide 28 is preferably a metal tube having an internal coating that is an excellent infrared reflector and has very low emissivity. Waveguide 28 extends through the bottom of insulating liner 14 and support pan 16 so as to have a first end 30 disposed in the interior of burner assembly 10 adjacent to radiation collector 24 and a second end 32 located outside of burner assembly 10 adjacent to detector 26. Preferably, waveguide 28 extends through the bottom of insulating liner 14 and support pan 16 at their respective center points so as not to interfere with element 12. While detector 26 is shown as being located not only below burner assembly 10 but also beyond its outer circumference, it should be noted that detector 26 could also be located directly below the point at which waveguide 28 extends through the bottom of insulating liner 14 and support pan 16.

Figure 2:
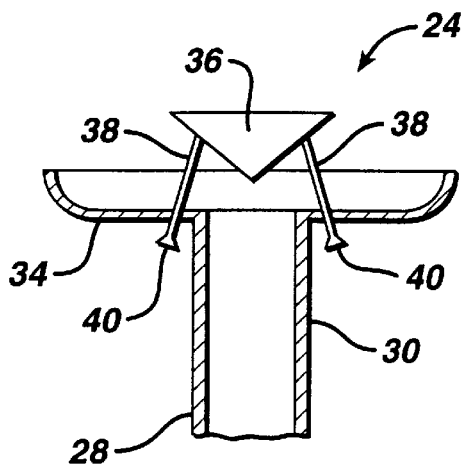
FIG. 2 is an enlarged sectional view of the sensor assembly of FIG. 1 in a raised position.
Figure 3:
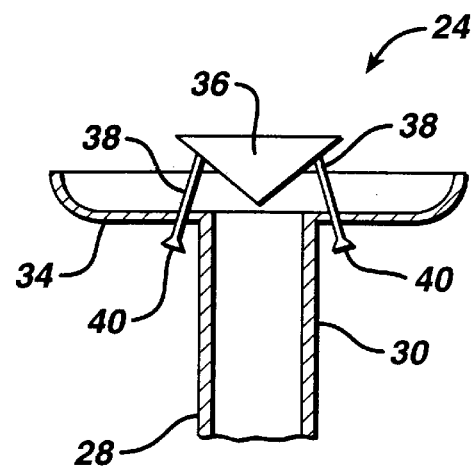
FIG. 3 is an enlarged sectional view of the sensor assembly of FIG. 1 in a lowered position.

Turning to FIGS. 2 and 3, a first embodiment of the present invention is shown in greater detail. In this embodiment, radiation collector 24 includes a bowl-shaped reflective surface 34 and a conical reflective surface 36. Bowl-shaped reflective surface 34 is attached to first end 30 of waveguide 28 so as to face the underside of glass-ceramic plate 20 and surround the entrance of waveguide 28. Conical reflective surface 36 is suspended above bowl-shaped reflective surface 34, directly over the entrance of waveguide 28, by a plurality of supports 38 extending between the two reflective surfaces. Thus, radiation emanating from (or through) glass-ceramic plate 20 that strikes bowl-shaped reflective surface 34 will be reflected onto conical reflective surface 36 and then re-reflected into waveguide 28.

Supports 38 are configured to be mechanically adjustable by means of set screws 40 so that the position of conical reflective surface 36 can be varied relative to bowl-shaped reflective surface 34. Set screws 40 are disposed in bowl-shaped reflective surface 34 in abutment with supports 38 such that adjustment of set screws 40 will cause vertical displacement of supports 38, thereby altering the height of conical reflective surface 36. Adjusting the relative height of conical reflective surface 36 will correspondingly adjust the field of view of detector 26. For instance, when conical reflective surface 36 is raised as in FIG. 2, the field of view is greater than it is when conical reflective surface 36 is lowered as in FIG. 3.

Figure 4:
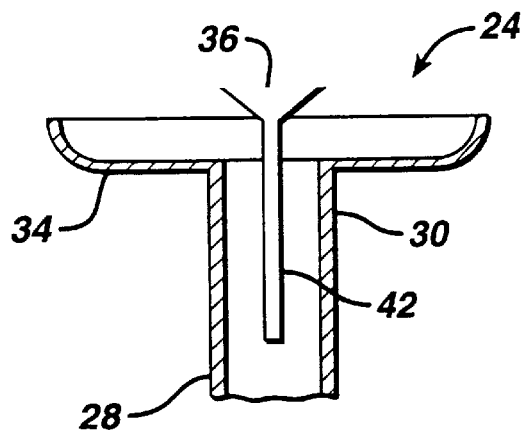
FIG. 4 is a sectional view of a second embodiment of the sensor assembly of the present invention.
Figure 5:
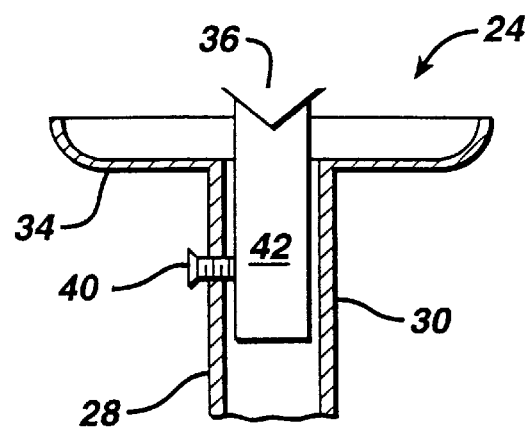
FIG. 5 is another sectional view of the second embodiment of the sensor assembly, rotated ninety degrees from the view of FIG. 4.

FIGS. 4 and 5 show a second embodiment of the present invention wherein conical reflective surface 36 of radiation collector 24 is supported by a reed-like member 42 that is attached to or integrally formed on conical reflective surface 36. Reed-like member 42 extends downwardly from the bottom of the conical portion of conical reflective surface 36 into waveguide 28. Vertical adjustment of conical reflective surface 36 is achieved through use of one or more set screws 40 that extend through the side of waveguide 28 and engage reed-like member 42 such that loosening set screw 40 will permit adjustment of conical reflective surface 36.

Figure 6:
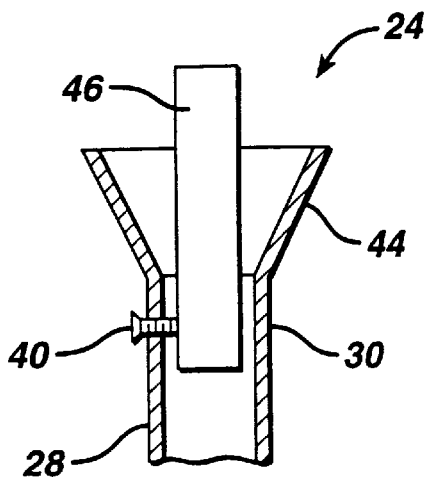
FIG. 6 is a sectional view of a third embodiment of the sensor assembly of the present invention.
Figure 7:
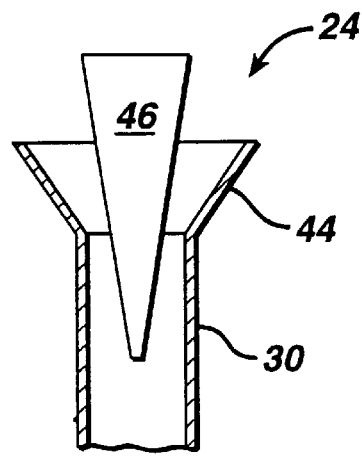
FIG. 7 is another sectional view of the third embodiment of the sensor assembly, rotated ninety degrees from the view of FIG. 6.

FIGS. 6 and 7 show a third embodiment of the present invention. In this embodiment, radiation collector 24 includes an inverted conical reflective surface 44 and a wedge-shaped reflective surface 46. Inverted conical reflective surface 44 is attached to first end 30 of waveguide 28 so as to face the underside of glass-ceramic plate 20 and surround the entrance of waveguide 28. Wedge-shaped reflective surface 46 is suspended over inverted conical reflective surface 44 with its narrow end disposed in waveguide 28. Vertical adjustment of wedge-shaped reflective surface 46 is achieved through use of one or more set screws 40 that extend through the side of waveguide 28 and engage a surface of wedge-shaped reflective surface 46 such that loosening set screw 40 will permit adjustment of wedge-shaped reflective surface 46. Radiation emanating from (or through) glass-ceramic plate 20 that strikes either of the two reflective surface 44,46 will be reflected one or more times into waveguide 28.

Figure 8:
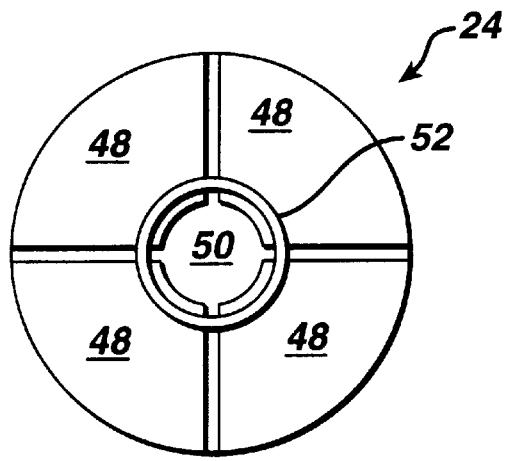
FIG. 8 is a top view of a fourth embodiment of the sensor assembly of the present invention.
Figure 9:
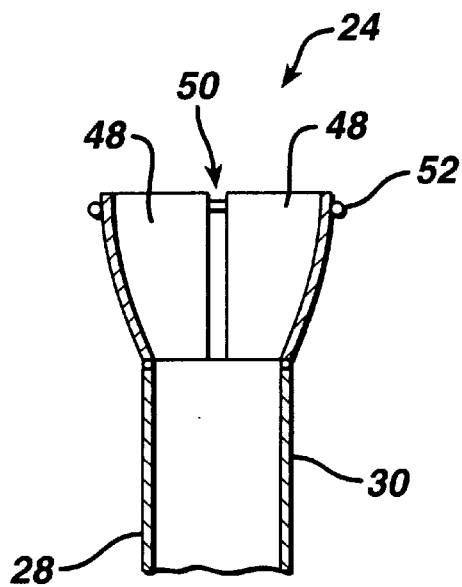
FIG. 9 is a sectional view of a second embodiment of the sensor assembly of FIG. 8 in a relatively opened position.
Figure 10:
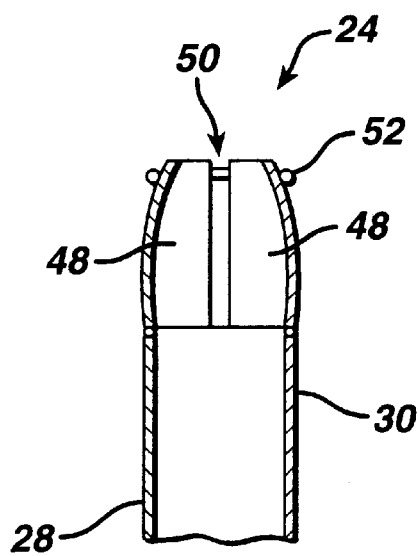
FIG. 10 is a sectional view of a second embodiment of the sensor assembly of FIG. 8 in a relatively closed position.

FIGS. 8–10 show a fourth embodiment of the present invention. In this embodiment, radiation collector 24 includes a plurality of concave curved reflector surfaces 48 hinged to first end 30 of waveguide 28 so as to pivot about the hinge axis. Curved reflector surfaces 48 are arranged around the entire perimeter of first end 30. As shown in the FIG. 8, four reflector surfaces 48 are used, although this number could be varied. Reflector surfaces 48 are preferably of a compound parabolic configuration curving inwardly so as to define an opening 50. Thus, radiation emanating from (or through) glass-ceramic plate 20 that strikes opening 50 will be reflected by curved reflector surfaces 48 into waveguide 28. Because curved reflector surfaces 48 are hinged to waveguide 28, the size of opening 50 can be adjusted to adjust the field of view of detector 26. For instance, when the size of opening 50 is relatively large as in FIG. 9, the field of view is greater than it is when the size of opening 50 is relatively small as in FIG. 10. In this embodiment, the size of opening 50 is controlled by an adjustable wire loop 52 connected about the outer ends of curved reflector surfaces 48.

Figure 11:
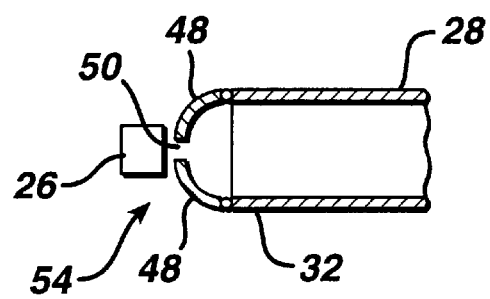
FIG. 11 is an enlarged sectional view of the detector end of the sensor assembly.

FIG. 11 shows a concentrator 54 that is attached to second end 30 of waveguide 28, adjacent to detector 26. Concentrator 54 is structurally similar to the radiation collector of the fourth embodiment in that it has a plurality of concave curved reflector surfaces 48 hinged to second end 32 so as to define an adjustable opening 50. In this case, adjusting the size of opening 50 determines the amount of radiation that will be focused onto detector 26.

FIG. 12 shows a fifth embodiment of the present invention. In this embodiment, radiation collector 24 includes a bowl-shaped reflective surface 56 formed in insulating liner 14 adjacent to waveguide 28 and an annular reflective surface 58 formed in the interior side of upwardly extending portion 18 of insulating liner 14 near the perimeter of burner assembly 10. Both reflective surfaces 56, 58 define concave surfaces facing the underside of glass-ceramic plate 20. A conical reflective surface 36 is suspended above first annular reflective surface 56, directly over the entrance of waveguide 28, by a plurality of supports 38 extending between conical reflective surface 36 and insulating layer 14. Thus, radiation emanating from (or through) glass-ceramic plate 20 that strikes either of the first and second annular reflective surfaces 56, 58 will be reflected onto conical reflective surface 36 and then re-reflected into waveguide 28.

Supports 38 are configured to be mechanically adjustable by means of set screws 40 so that the position of conical reflective surface 36 can be varied relative to first and second annular reflective surfaces 56, 58. Set screws 40 are disposed in insulating layer 14 in abutment with supports 38 such that adjustment of set screws 40 will cause vertical displacement of supports 38, thereby altering the height of conical reflective surface 36. Adjusting the relative height of conical reflective surface 36 will correspondingly adjust the field of view of detector 26.

Figure 13:
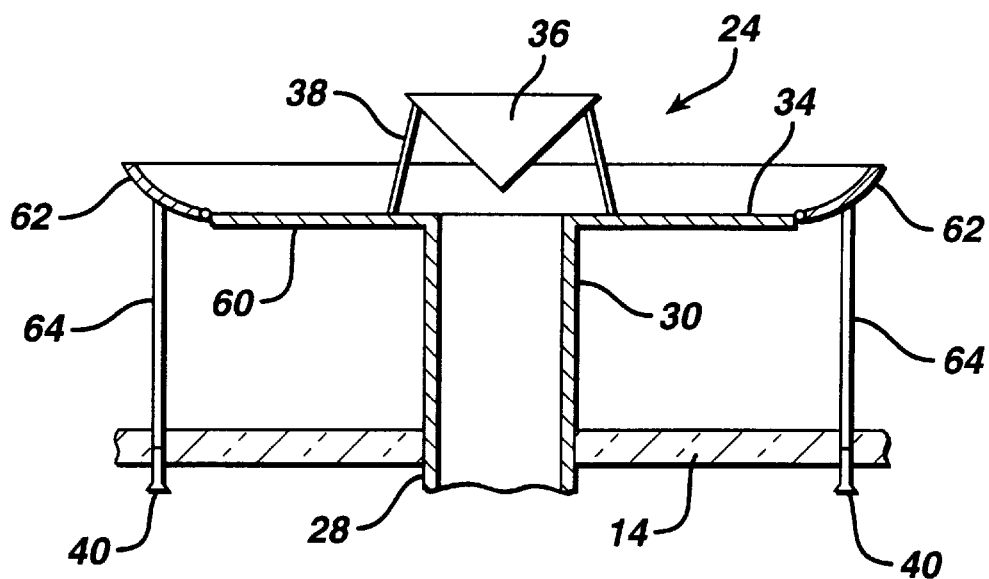
FIG. 13 is a sectional view of a sixth embodiment of the sensor assembly in a lowered position.
Figure 14:
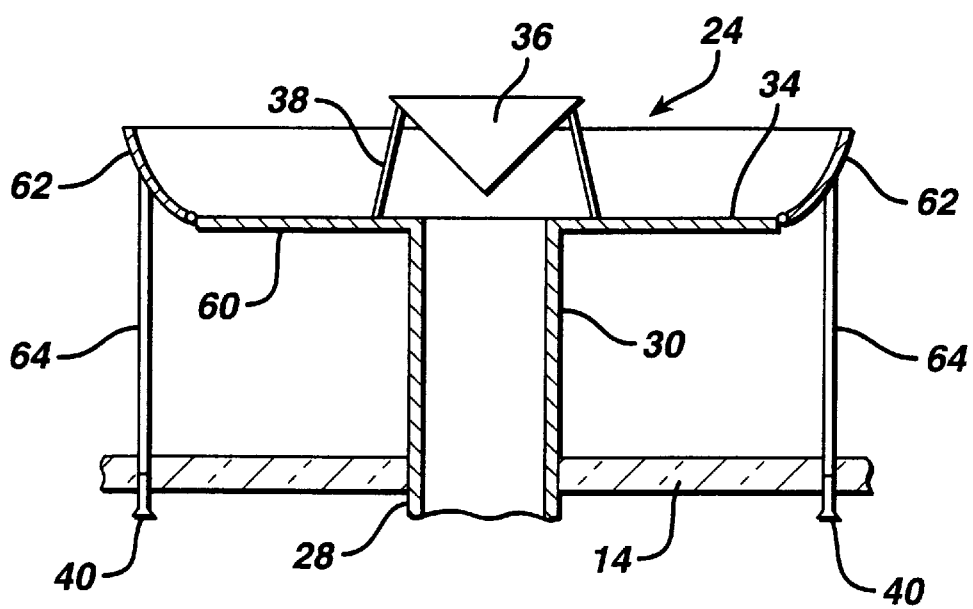
FIG. 14 is a sectional view of a sixth embodiment of the sensor assembly in a raised position.

FIGS. 13 and 14 show a sixth embodiment of the present invention. In this embodiment, radiation collector 24 includes a bowl-shaped reflective surface 34 and a conical reflective surface 36. Bowl-shaped reflective surface 34 includes an annular main portion 60 which is attached to first end 30 of waveguide 28 so as to face the underside of glass-ceramic plate 20 and surround the entrance of waveguide 28, and a plurality of outer wings 62 distributed about the perimeter of main portion 60. Outer wings 62 are hinged to the outer edge of main portion 60 so as to pivot about the hinge axis. Conical reflective surface 36 is fixedly suspended above bowl-shaped reflective surface 34, directly over the entrance of waveguide 28, by a plurality of supports 38. Thus, radiation emanating from (or through) glass-ceramic plate 20 that strikes bowl-shaped reflective surface 34 will be reflected onto conical reflective surface 36 and then re-reflected into waveguide 28.

A separate adjustment member 64 extends from the base of insulating liner 14 to each outer wing 62. Adjustment members 64 are mechanically adjustable by means of set screws 40 so that the angle of outer wings 62 can be varied (that is, outer wings 62 can be raised or lowered), thus varying the position of outer wings 62 relative to conical reflective surface 36. Set screws 40 are disposed in insulating layer 14 in abutment with adjustment members 64 such that adjustment of set screws 40 will cause vertical displacement of adjustment members 64, thereby altering the position of outer wings 62. Adjusting the relative position of outer wings 62 will correspondingly adjust the field of view of detector 26. For instance, when outer wings 62 are lowered as in FIG. 13, the field of view is greater than it is when outer wings 62 are raised as in FIG. 14.

The foregoing has described a remote sensor assembly for a burner in a glass-ceramic cooktop appliance that can be calibrated to adjust its field of view. While specific embodiments of the present invention have been described, it will be apparent to those skilled in the art that various modifications thereto can be made without departing from the spirit and scope of the invention as defined in the appended claims.

What is claimed is:

1. A sensor assembly for a glass-ceramic cooktop appliance having at least one burner assembly disposed under a glass-ceramic plate, said sensor assembly comprising:
   a waveguide having first and second ends, said first end being disposed in said burner assembly;
   at least one detector located adjacent to said second end of said waveguide;
   a radiation collector located adjacent to said first end of said waveguide so as to direct incident radiation into said waveguide, said radiation collector including a plurality of reflective surfaces; and
   means for adjusting the position of said reflective surfaces relative to one another.

2. The sensor assembly of claim 1 wherein said plurality of reflective surfaces includes a bowl-shaped reflective surface disposed around said first end of said waveguide and a conical reflective surface disposed above said first end of said waveguide, and said means for adjusting includes a plurality of supports extending between said bowl-shaped reflective surface and said conical reflective surface and a plurality of set screws arranged to displace said supports.

3. The sensor assembly of claim 2 further comprising an annular reflective surface disposed near the perimeter of said burner assembly.

4. The sensor assembly of claim 1 wherein said plurality of reflective surfaces includes a bowl-shaped reflective surface disposed around said first end of said waveguide and a conical reflective surface disposed above said first end of said waveguide, said conical reflective surface having a reed-like member extending therefrom into said waveguide, and said means for adjusting includes a set screw extending through said waveguide and engaging said reed-like member.

5. The sensor assembly of claim 1 wherein said plurality of reflective surfaces includes an inverted conical reflective surface attached to said first end of said waveguide and a wedge-shaped reflective surface disposed over said inverted conical reflective surface, and said means for adjusting includes a set screw extending through said waveguide and engaging said wedge-shaped reflective surface.

6. The sensor assembly of claim 1 wherein each one of said plurality of reflective surfaces is a concave curved reflector surface hinged to said first end of said waveguide, and said means for adjusting is an adjustable wire loop connected about said concave curved reflector surfaces.

7. The sensor assembly of claim 6 wherein said concave curved reflector surfaces have a compound parabolic configuration.

8. The sensor assembly of claim 1 wherein said plurality of reflective surfaces includes a bowl-shaped reflective surface and a conical reflective surface disposed above said first end of said waveguide, said bowl-shaped reflective surface including an annular main portion attached to said first end of said waveguide and a plurality of outer wings hinged to the outer edge of said main portion, and said means for adjusting includes a plurality of adjustment members extending between said burner assembly and said outer wings and a plurality of set screws arranged to displace said adjustment members.

9. A method for calibrating a sensor assembly having a plurality of reflective surfaces, said method comprising the steps of:

locating said reflective surfaces so as to provide said reflective surfaces with a field of view of a desired sensing location; and adjusting the position of said reflective surfaces relative to one another to adjust said field of view.

10. The method of claim 9 wherein said step of adjusting the position of said reflective surfaces relative to one another comprises displacing one of said reflective surfaces with respect to another one of said reflective surfaces.

11. The method of claim 10 wherein the displacement is controlled by at least one set screw.

12. The method of claim 9 wherein said step of adjusting the position of said reflective surfaces relative to one another comprises pivoting at least one of said reflective surfaces about an axis.

13. The method of claim 12 wherein the pivoting is controlled by an adjustable wire loop.

14. The method of claim 12 wherein all of said reflective surfaces are pivoted about an axis.

15. The method of claim 9 wherein said step of adjusting the position of said reflective surfaces relative to one another comprises pivoting a portion of one of said reflective surfaces about an axis.

16. The method of claim 15 wherein the pivoting is controlled by at least one set screw.

* * * * *